No. 811,201. PATENTED JAN. 30, 1906.
E. W. CHADWICK.
GLASS CUTTING BOARD.
APPLICATION FILED JULY 25, 1905.
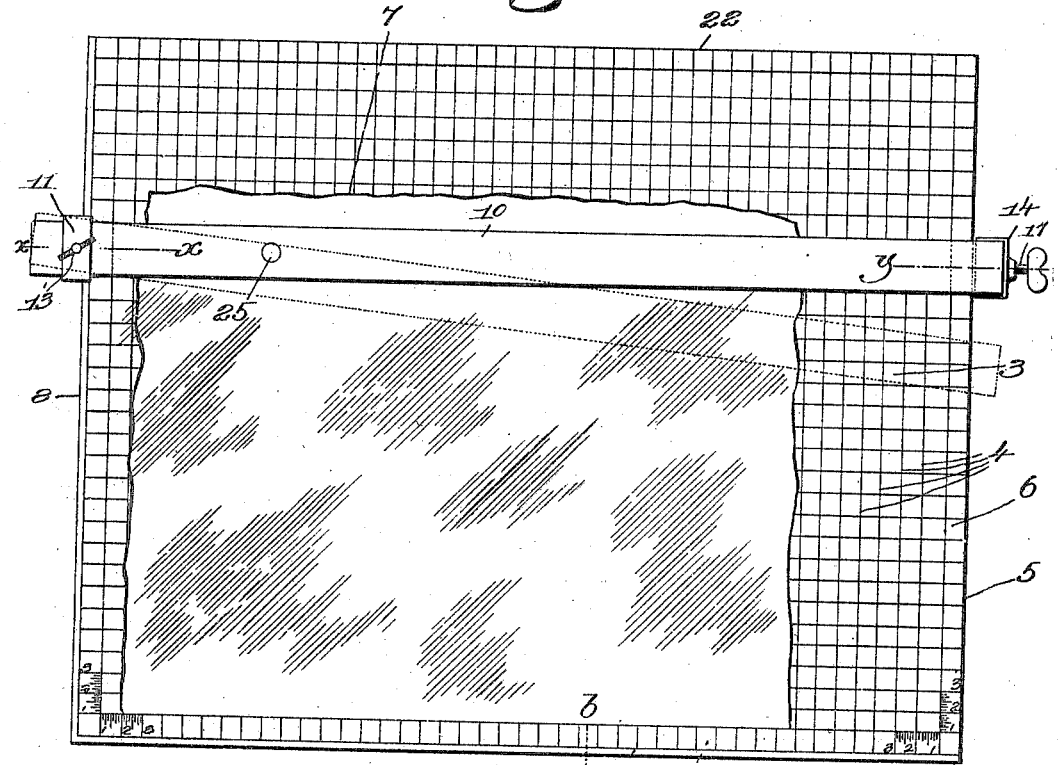
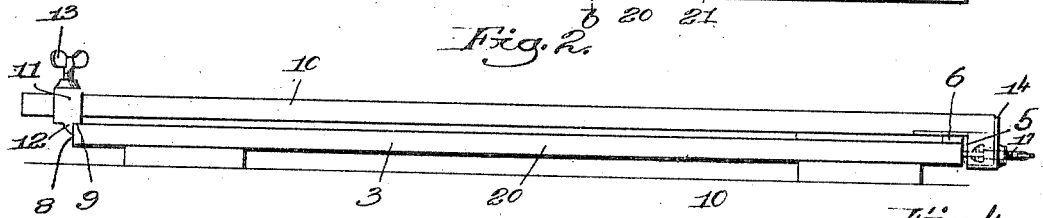
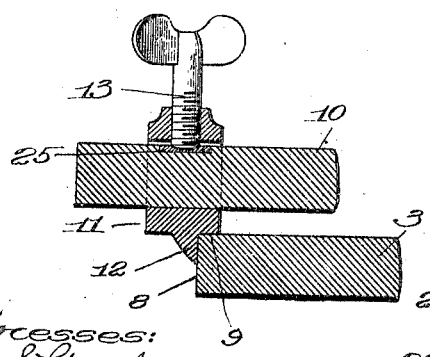
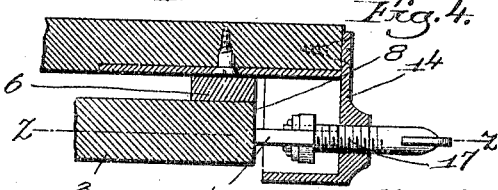
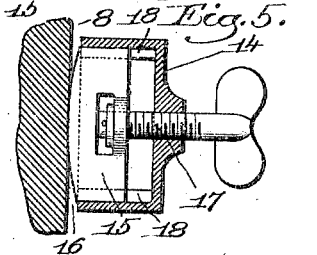

UNITED STATES PATENT OFFICE.

EDWARD W. CHADWICK, OF EDGARTOWN, MASSACHUSETTS.

GLASS-CUTTING BOARD.

No. 811,201.  Specification of Letters Patent.  Patented Jan. 30, 1906.

Application filed July 25, 1905. Serial No. 271,237.

*To all whom it may concern:*

Be it known that I, EDWARD W. CHADWICK, a citizen of the United States, residing at Edgartown, county of Dukes, and State of Massachusetts, have invented an Improvement in Glass-Cutting Boards, of which the following description, in connection with the accompanying drawings, is a specification, like numerals on the drawings representing like parts.

This invention relates to a novel device for use in cutting glass; and it comprises a board on which the glass rests and which is provided adjacent its edges with graduations representing units of measure.

One edge of the board is provided with a flange rising therefrom which constitutes a gage against which the glass may rest while being cut.

Coöperating with the board is a straight-edge for guiding the glass-cutter. Said straight-edge rests at one end upon the gage and is thus sustained at said end slightly above the glass on the board and is held in its adjusted position on the board by two clamping members, which engage the edges of the board.

In using the improved device the glass is placed on the board with one side resting against the gage and the straight-edge applied to the board, as above described, and adjusted thereon to bring the edge thereof along the line where it is desired to cut the glass. Said straight-edge is then clamped in position, and the glass may be cut to the desired size by moving the glass-cutter along the edge of the straight-edge.

The particular features wherein my invention resides will be referred to in detail in the accompanying specification and pointed out in the following claims.

Figure 1 is a plan view of a board embodying my invention. Fig. 2 is an edge view thereof. Fig. 3 is a section, on an enlarged scale, on the line $x\ x$, Fig. 1. Fig. 4 is a section, on an enlarged scale, on the line $y\ y$, Fig. 1. Fig. 5 is a section on the line $z\ z$, Fig. 4; and Fig. 6 is a section on the line $b\ b$, Fig. 1.

The board is designated by 3 and is preferably made rectangular, though it might have any shape without altering the invention. The surface of the board on which the glass rests is preferably ruled or provided with parallel lines 4, which are conveniently spaced at a distance of an inch apart. In the board illustrated in Fig. 1 these lines are arranged at right angles to each other and parallel with the edges of the board.

One edge 5 of the board is provided with a flange 6, which rises from the board and which constitutes a gage against which one edge of the glass 7 to be cut may be placed, said gage having a thickness slightly greater than the glass to be cut.

10 designates a straight-edge, which is of a length to extend clear across the board. On one end of the straight-edge is adjustably mounted a clamping member 11, which is provided with a clamping-foot 12 to rest against the edge 8 of the board and a shoulder 9 to rest on top of the board, said shoulder operating to space the straight-edge from the board sufficiently to prevent the straight-edge from resting on the glass.

The clamping member herein illustrated is provided with an aperture through which the straight-edge extends and is clamped to said straight-edge by any suitable means, such as a clamping-screw 13.

The opposite end of the straight-edge is provided with a clamping member 14, which has adjustably mounted therein a foot 15, adapted to rest against the edge 5 of the board, said foot having a rounded edge 16 for the purpose hereinafter described. This foot 15 has swiveled thereto a clamping-screw 17, in screw-threaded engagement with the clamping member 14, whereby the foot may be adjusted relative to the clamping member. Said clamping member is provided with suitable guides 18, by means of which the foot is guided in its movement.

I prefer to make the clamping member 14 rigid with the straight-edge 10, although it could be adjustably secured thereto, if desired. The clamping member 11, however, is adjustably mounted on the straight-edge for reasons which will hereinafter appear.

When the straight-edge is in place on the board, one end thereof rests on and is supported by the gage 6, while the other end is held sufficiently above the board to accommodate the glass by the shoulder 9 on the clamping member 11, as shown. The top surface of the gage 6 is ruled or provided with graduations, and the surface of the board adjacent the edge 8 is also provided with similar graduations. For convenience I prefer to make these rules in inches. The edge 20 of the board may also be provided with a gage 21, similar to the gage 6, and the top surface of the gage 21 is also ruled in inches and the surface of the board adjacent the edge 22 similarly ruled.

In using my improved board the glass 7 to be cut is placed with its edges against either or both of the gages 6 and 20, as illustrated, and if it is desired to cut said glass twenty by twenty-four inches, for instance, the straight-edge is adjusted until one edge thereof coincides with the "20" mark on the scale at opposite sides of the board, and then it is clamped in such position by tightening up the adjusting-screw 17 and clamping the foot 15 against the edge of the board. The operator then moves the glass-cutter in contact with the straight-edge over the glass, thereby cutting it to the desired dimension. For getting the other dimension the glass may be shifted on the board, or the straight-edge may be removed and made to extend between the edges 20 and 22 or at right angles to the position shown in Fig. 1, and after having been properly clamped in adjusted position the other dimension of the glass may be secured.

Since the board illustrated is longer in one dimension than in the other, I have made the clamping member 11 capable of adjustment on the straight-edge.

To prevent the straight-edge from becoming worn by the clamping-screw 13 I prefer to embed therein at appropriate points wearing-washers 25.

The reason for making the surface 16 of the foot of the clamping member 14 rounded is to permit the straight-edge to be swung into an angular position, as shown in dotted lines, Fig. 1, and to be firmly clamped therein when it is desired to cut one edge of the glass on an angle.

Various changes may be made in the construction of the device without departing from the spirit and scope of my invention.

Having fully described my invention, what I claim as new, and desire to secure by Letters Patent, is—

1. A board for cutting glass having on one side a gage which projects above the surface of the board, a straight-edge of a length to extend across the board, one end of said straight-edge being adapted to rest on the gage, means carried by the straight-edge to space the other end thereof from the board, and means to clamp said straight-edge to the board in any adjusted position.

2. A board for cutting glass having on two adjacent sides a gage extending above the surface of the board, and against which the glass to be cut rests, a straight-edge resting at one end upon said gage, two clamping members on said straight-edge to clamp it to opposite edges of the board, one of the clamping members being constructed to space the adjacent end of the straight-edge above the board.

3. A board for cutting glass having a scale on the surface of the board adjacent one edge, a gage applied to the opposite edge of said board and extending above the surface of the same, the surface of the gage having a scale applied thereto, a straight-edge resting at one end upon said gage, a clamping member secured to said end of the straight-edge, said clamping member having an adjustable foot to engage the adjacent edge of the board, and another clamping member secured to the opposite end of the gage and having a foot to engage the adjacent edge of the board, said latter clamping member having a shoulder to rest on the top of the board and thereby space from the board the end of the straight-edge to which it is secured.

4. A board for cutting glass having a scale on the surface of the board adjacent one edge, a gage applied to the opposite edge of said board and extending above the surface of the same, the surface of the gage having a scale applied thereto, a straight-edge resting at one end upon said gage, a clamping member secured to said end of the straight-edge, said clamping member having an adjustable foot to engage the adjacent edge of the board, and another clamping member adjustably secured to the opposite end of the gage and having a foot to engage the adjacent edge of the board, one of said feet having a rounding edge.

In testimony whereof I have signed my name to this specification in the presence of two subscribing witnesses.

EDWARD W. CHADWICK.

Witnesses:
   Joseph K. Silva,
   J. W. Pease.